(No Model.)
G. W. ATKINS.
MUD FENDER FOR VEHICLES.
No. 359,530. Patented Mar. 15, 1887.
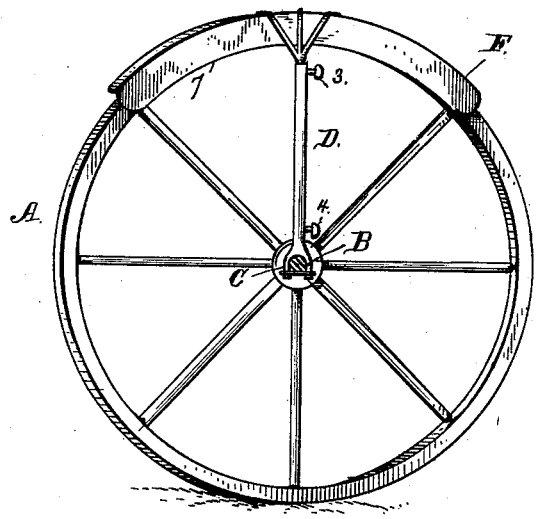
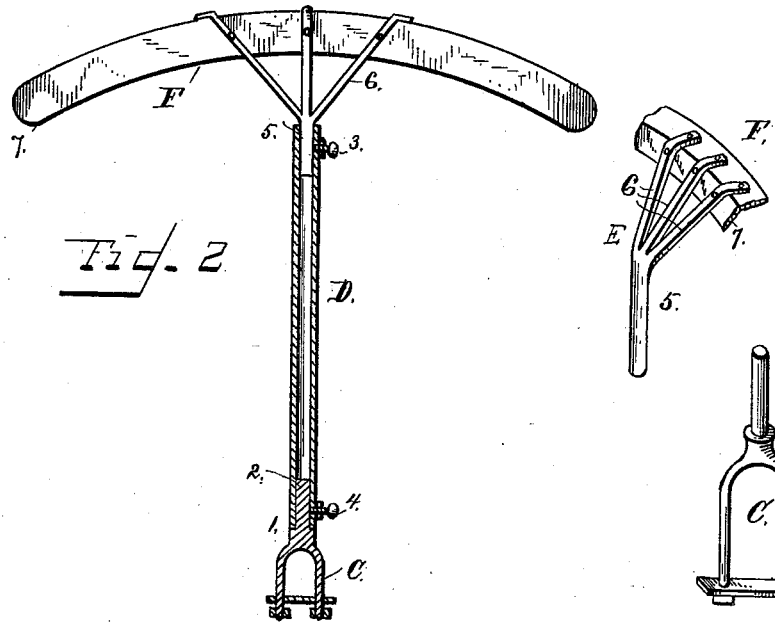
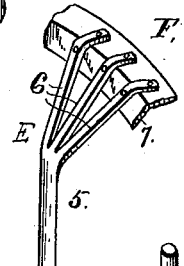
Witnesses
J. Thomson Cross
E. T. Pritchard
Inventor
Geo. W. Atkins.
By his Attorney A. G. Hylman

UNITED STATES PATENT OFFICE.

GEORGE W. ATKINS, OF CLARION, PENNSYLVANIA.

MUD-FENDER FOR VEHICLES.

SPECIFICATION forming part of Letters Patent No. 359,530, dated March 15, 1887.

Application filed September 1, 1886. Serial No. 212,371. (No model.)

*To all whom it may concern:*

Be it known that I, GEORGE W. ATKINS, a citizen of the United States of America, residing at Clarion, in the county of Clarion and State of Pennsylvania, have invented a new and useful Mud-Fender for Road-Vehicles, of which the following is a specification.

My invention has relation to devices for keeping the mud and dirt of the road from splashing against or into the vehicle; and it consists in a clip adapted to be fixed to the axle of the vehicle, and carrying a vertical standard having detachably secured to its upper end the fender, as will be hereinafter more fully described, and specifically pointed out in the claim made hereto.

I have fully illustrated my improvements in the accompanying drawings, wherein—

Figure 1 is a side view of the mud-fender attached to the axle of a vehicle. Fig. 2 is a side view of the fender, and Fig. 3 shows the parts separated and in detail.

Reference being had to the drawings, the letter A designates the hind wheel of a buggy or other light road-vehicle, and the letter B designates the axle thereof.

The letter C designates a clip having the usual side arms and clip-plate to secure it to the axle, and having formed on the top face of the arch a seat, 1, from which is extended a vertical post or standard, 2, to receive and retain the tubular rod which supports the fender.

The letter D designates a tubular rod of such length as when applied to the standard 2 and having the fender set in its upper end the latter will be brought in ready adjustable position over the wheel. In the tubular rod at the upper and lower end thereof are set-screws 3 4, which secure the rod of the fender and the standard of the clip in such position as may be desired.

The letter E designates the fender-support, consisting of the foot-piece 5, to set within the supporting-tube, and the upward-projecting arms 6, bent outward with their ends to overhang the wheel and having their ends formed to be secured in or to the fender F, substantially as seen in the drawings.

The letter F designates the mud-fender. This consists of a light piece of wood or other suitable material formed as a segment, and curved to suit the curvature of the wheel to which it is to be applied, and arranged to project over the rim of the wheel; and in order that additional protection may be had to the vehicle, I secure to the inner side of the main-fender segment a supplemental plate or fender, 7, which, as seen, extends for a distance down on the inner side of the wheel and prevents the drippings of the dirt or mud on the felly from being thrown on or in the vehicle.

It will be observed by reference to Fig. 1 of the drawings that the clip sustaining the fender may be used to clip the brace of the reach to the axle.

The parts are applied by setting the tubular rod on the standard of the clip and securing it thereto by the set-screw, and then setting the foot of the fender-support in the upper end of the tube and adjusting the attached fender to a position over the wheel.

The parts may be of light metal of such strength and substantialness as to meet the purposes intended.

What I claim as my invention, and desire to secure by Letters Patent, is—

The combination, with the axle of a road-vehicle, of a fender comprising a clip, C, secured to the axle and formed with a vertical standard, a vertical tubular supporting-rod arranged on said standard, a fender-support formed with a foot-piece, 5, to set within the supporting-rod, and arms 6, outwardly inclined over the wheel, and a fender secured to the overhanging ends of the arms of the fender-support, consisting of a segmental plate arranged over the rim of the wheel and a supplemental plate secured to the inner side of the segmental plate, substantially as described.

In witness whereof I have hereunto set my hand in the presence of two attesting witnesses.

GEORGE W. ATKINS.

Attest:
W. H. SLOAN,
SAML. K. CLARKE.